(12) United States Patent  
Huang et al.

(10) Patent No.: US 9,419,511 B2
(45) Date of Patent: Aug. 16, 2016

(54) CAPACITOR DISCHARGING METHOD AND DISCHARGING CIRCUIT THEREOF

(71) Applicant: Silergy Semiconductor Technology (Hangzhou) LTD, Hangzhou, ZheJiang Province (CN)

(72) Inventors: Qiukai Huang, Hangzhou (CN); Yunlong Han, Hangzhou (CN); Xiaoru Xu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 161 days.

(21) Appl. No.: 14/243,719

(22) Filed: Apr. 2, 2014

(65) Prior Publication Data

US 2014/0307486 A1    Oct. 16, 2014

(30) Foreign Application Priority Data

Apr. 12, 2013   (CN) .......................... 2013 1 0129357

(51) Int. Cl.
*H02M 1/32* (2007.01)
*H02M 3/335* (2006.01)

(52) U.S. Cl.
CPC ............... *H02M 1/32* (2013.01); *H02M 3/335* (2013.01); *H02M 3/33507* (2013.01); *H02M 3/33569* (2013.01); *H02M 2001/322* (2013.01)

(58) Field of Classification Search
CPC ....................................................... H02M 1/08
USPC .......................................... 323/288, 222, 284
See application file for complete search history.

(56) References Cited

U.S. PATENT DOCUMENTS

| 7,200,015 | B1 | 4/2007 | Mirskiy | |
|---|---|---|---|---|
| 7,888,880 | B2 | 2/2011 | Huang et al. | |
| 2007/0058398 | A1* | 3/2007 | Yang | H02M 1/36 363/16 |
| 2008/0106916 | A1* | 5/2008 | Yamazaki | H02M 1/36 363/21.01 |
| 2013/0076315 | A1 | 3/2013 | Liu et al. | |

* cited by examiner

*Primary Examiner* — Jeffrey Gblende
*Assistant Examiner* — Trinh Dang
(74) *Attorney, Agent, or Firm* — Michael C. Stephens, Jr.

(57) ABSTRACT

In one embodiment, a method of controlling a capacitor discharge for a switching power supply, can include: (i) generating a first voltage signal from a voltage at an X capacitor that is coupled between input terminals of the switching power supply; (ii) activating a detection signal in response to the first voltage signal being inactive for a duration of a predetermined time interval, where the detection signal being activated indicates a cut-off of the input terminals; and (iii) at least partially discharging the X capacitor after the cut-off and in response to activation of the detection signal.

7 Claims, 7 Drawing Sheets

CAPACITOR DISCHARGING METHOD AND DISCHARGING CIRCUIT THEREOF

RELATED APPLICATIONS

This application claims the benefit of Chinese Patent Application No. 201310129357.5, filed on Apr. 12, 2013, which is incorporated herein by reference in its entirety.

FIELD OF THE INVENTION

The present invention relates to the field of power supplies, and more particularly to a capacitor discharging method and discharging circuit for switching power supplies.

BACKGROUND

An "X" capacitor or "X-cap" may generally be coupled between line and neutral inputs of an AC voltage source of a switching power supply. An X capacitor may be configured as a safety capacitor, e.g., to suppress electromagnetic interference (EMI), such as differential mode (DM) noise. However, the capacitance of an X capacitor may be too large to timely discharge in some cases. When the AC voltage source is "cut-off", or otherwise turned off or disconnected, energy may remain stored in the X capacitor, and this may fail to meet various safety standards. In one example standard, the voltage between input terminals of an AC voltage source must decrease to 30% of the rated voltage within two seconds after the AC voltage source is cut-off. Thus, the X capacitor must be at least partially discharged after the AC voltage source is cut-off to meet such a safety standard.

SUMMARY

In one embodiment, a method of controlling a capacitor discharge for a switching power supply, can include: (i) generating a first voltage signal from a voltage at an X capacitor that is coupled between input terminals of the switching power supply; (ii) activating a detection signal in response to the first voltage signal being inactive for a duration of a predetermined time interval, where the detection signal being activated indicates a cut-off of the input terminals; and (iii) at least partially discharging the X capacitor after the cut-off and in response to activation of the detection signal.

In one embodiment, a capacitor discharging circuit for a switching power supply having an X capacitor coupled between input terminals of the switching power supply, can include: (i) a detection circuit configured to generate a first voltage signal from a voltage at the X capacitor; (ii) the detection circuit being configured to activate a detection signal in response to the first voltage signal being inactive for a duration of a predetermined time interval, where the detection signal being activated indicates a cut-off of the input terminals; and (iii) a discharging circuit configured to at least partially discharge the X capacitor after the cut-off and in response to activation of the detection signal.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
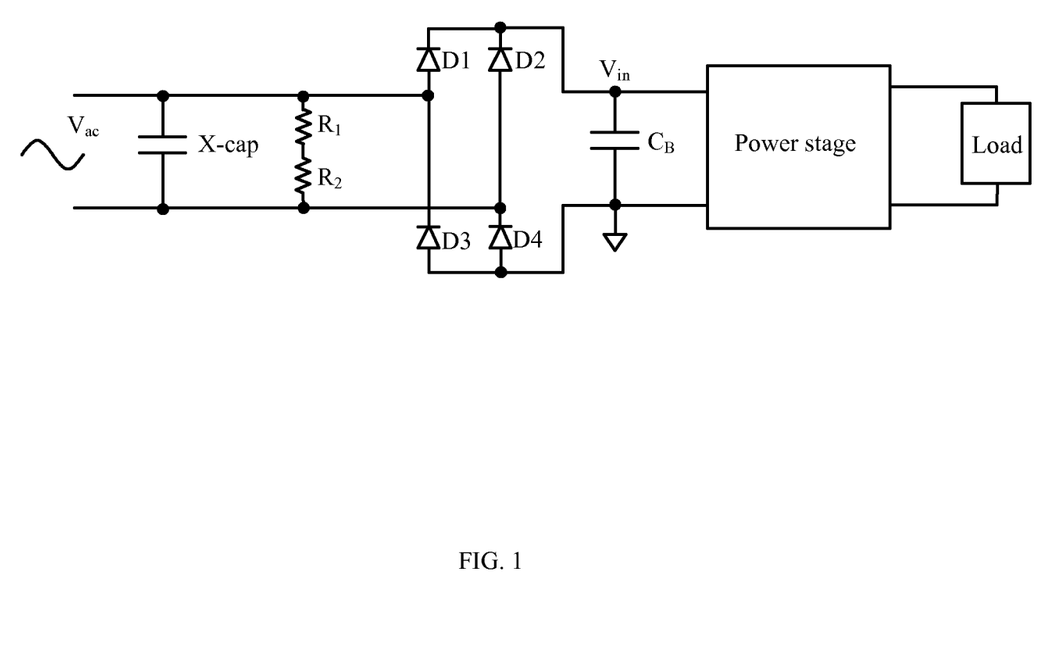
FIG. 1 is a schematic block diagram of a first example capacitor discharging circuit.

Referring now to FIG. 1, shown is a schematic block diagram of a first example capacitor discharging circuit. Here discharging resistors can be coupled in parallel with the X capacitor (X-cap). Resistors $R_1$ and $R_2$ can be coupled in series between the two terminals of the X capacitor in order to discharge the X capacitor to avoid problems of a higher voltage of the input terminals of the switching power supply after cut-off of the AC voltage source. However, certain power losses (e.g., from tens of mW to hundreds of mW) can occur due to the discharging resistors after "cut-in" (e.g., turn on or reconnection) of the AC voltage source. Such power losses can have substantial negative effects on input power losses, such as in cases of no load and standby operations. For example, no load and standby power losses should be less than 5 mW according to the standards of IEC 16301.

In one embodiment, a capacitor discharging circuit for a switching power supply having an X capacitor coupled between input terminals of the switching power supply, can include: (i) a detection circuit configured to generate a first voltage signal from a voltage at the X capacitor; (ii) the detection circuit being configured to activate a detection signal in response to the first voltage signal being inactive for a duration of a predetermined time interval, where the detection signal being activated indicates a cut-off of the input terminals; and (iii) a discharging circuit configured to at least partially discharge the X capacitor after the cut-off and in response to activation of the detection signal.

Figure 2:
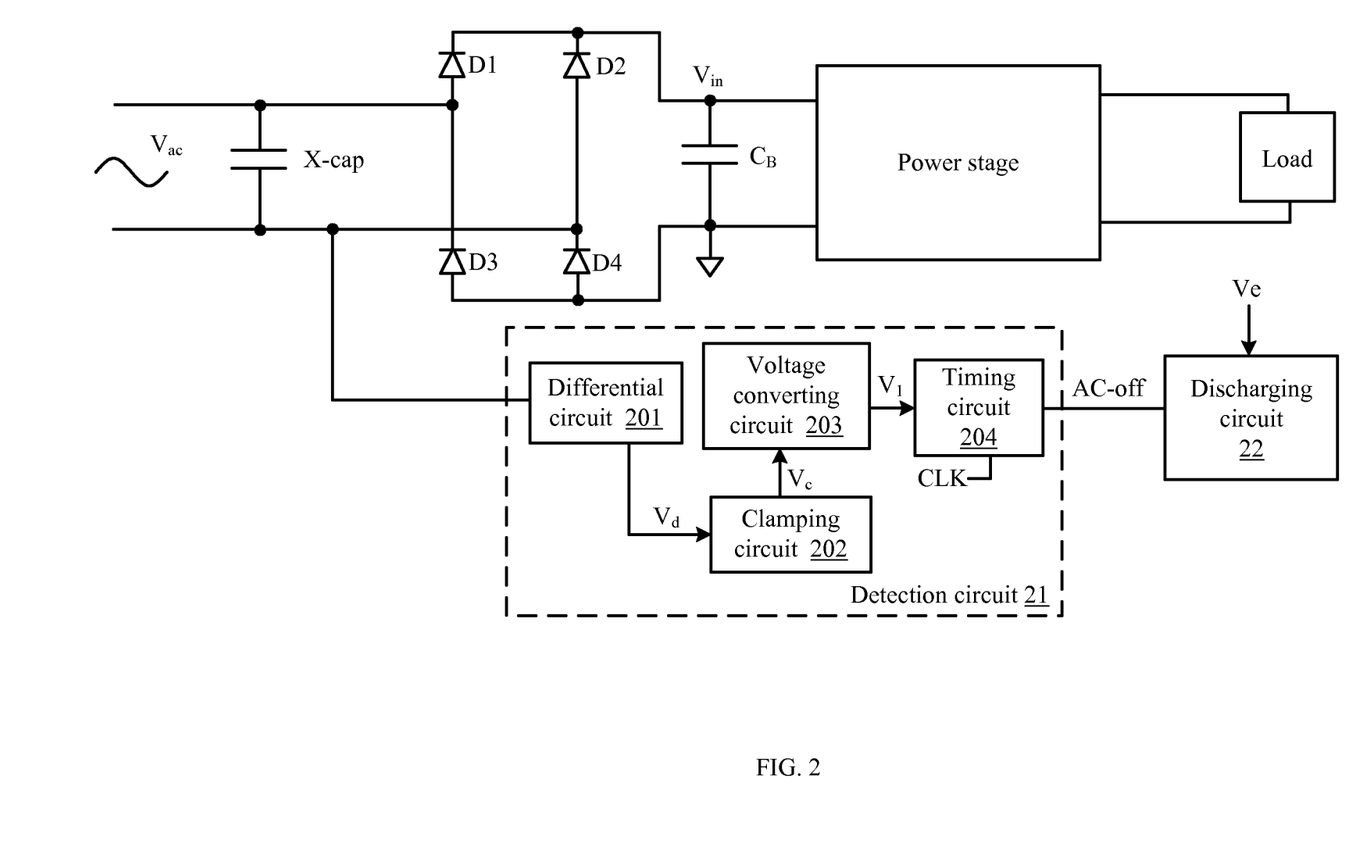
FIG. 2 is a schematic block diagram of a second example capacitor discharging circuit, in accordance with embodiments of the present invention.

Referring now to FIG. 2, shown is a schematic block diagram of a second example capacitor discharging circuit, in accordance with embodiments of the present invention. In this example, a switching power supply can include an X capacitor coupled between its input terminals, a rectifier bridge circuit formed by diodes D1-D4, and filtering capacitor $C_B$. In particular embodiments, the capacitor discharging circuit can include detection circuit 21 and discharging circuit 22. Detection circuit 21 can include differential circuit 201, clamping circuit 202, voltage converting circuit 203, and timing circuit 204. Differential circuit 201 can receive a voltage at one terminal of the X capacitor, and may generate differential signal $V_d$ by performing a differential operation. In this case, the voltage at one terminal of the X capacitor can be the voltage on a common node of the X capacitor and a negative input terminal.

Clamping circuit 202 can be configured to clamp differential signal $V_d$ within a range between predetermined upper and lower limits, to generate clamped voltage $V_c$. Voltage converting circuit 203 can convert clamped voltage $V_c$ to voltage signal $V_1$. Timing circuit 204 can receive voltage signal $V_1$ and clock signal CLK (e.g., with a fixed frequency) to generate detection signal "AC-off" at its output. Timing circuit 204 can detect active (e.g., logic high level) and inactive (e.g., logic low level) states of voltage signal $V_1$. For example, if voltage signal $V_1$ remains in a low or interactive state for a duration of a predetermined time interval, detection signal AC-off can go from a low (e.g., inactive) to a high (e.g., active or valid state). Detection signal AC-off being activated (e.g., transitioning from low to high) can indicate a cut-off or power outage of the input terminals of the switching power supply.

Discharging circuit 22 can receive detection signal AC-off and voltage signal $V_e$ to be discharged, in order to at least partially discharge the X capacitor after the cut-off of the input terminals of the switching power supply. In particular embodiments, voltage signal $V_e$ can be different voltages or signal connection points (e.g., a supply voltage $V_{CC}$ of an auxiliary supply circuit, voltage across filtering capacitor $C_B$, etc.). In any event, the voltage at one terminal of the X capacitor can be detected (e.g., via differential circuit 201) to generate voltage signal $V_1$. The state of voltage signal $V_1$ (e.g., high or low), can be detected to determine whether cut-off on the input terminals of the switching power supply has occurred. If the input terminals of the switching power are cut-off, the energy stored in the X capacitor can be at least partially released by discharging circuit 22. In this way, without discharging resistors and associated input power losses, converter efficiency can be improved.

Figure 3A:
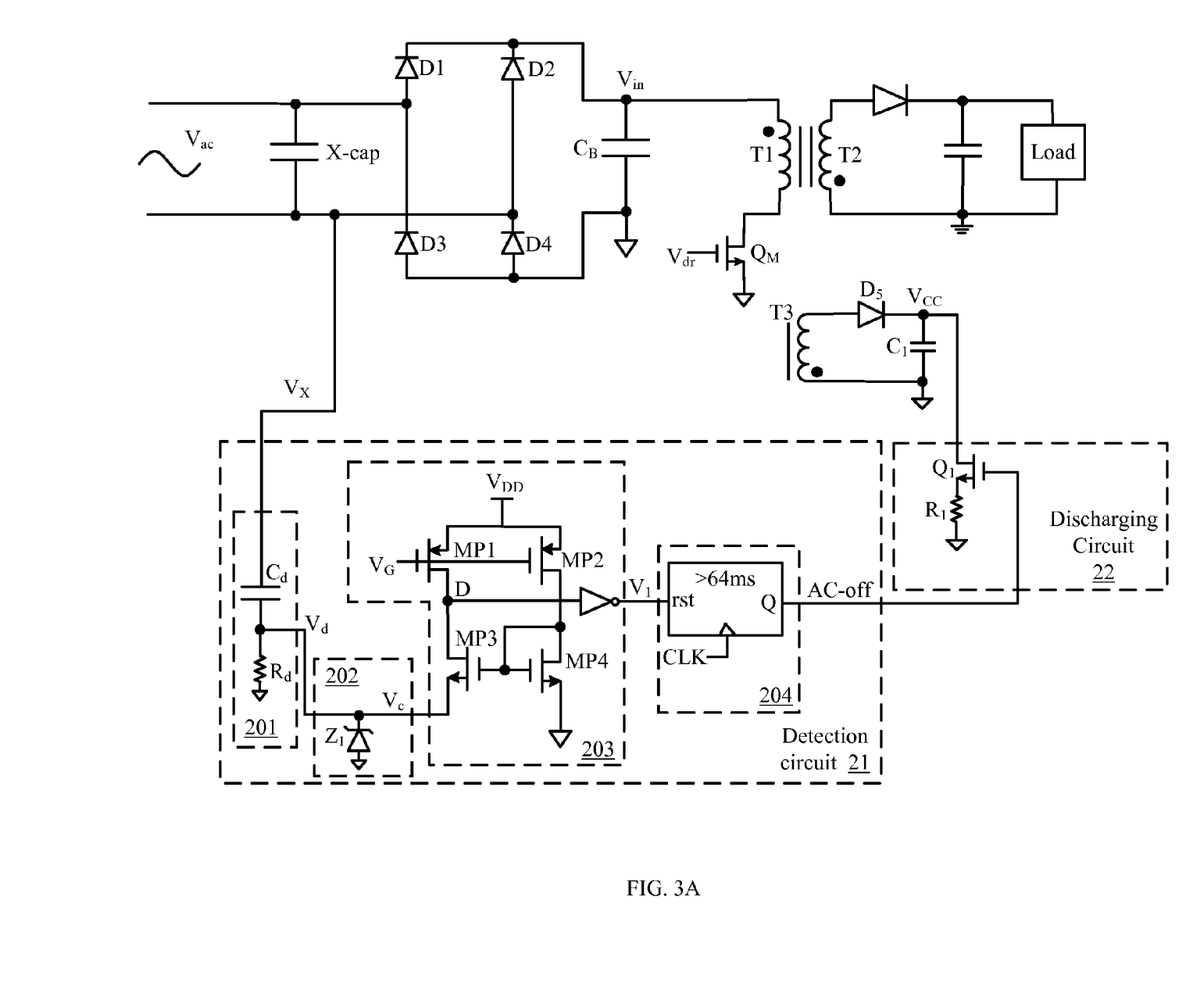
FIG. 3A is a schematic block diagram of a third example capacitor discharging circuit, in accordance with embodiments of the present invention.

Referring now to FIG. 3A, shown is a schematic block diagram of a third example capacitor discharging circuit, in accordance with embodiments of the present invention. In this example, the switching power supply can be configured as a flyback topology; however, any suitable converter topology (e.g., buck, boost, SEPIC, ZETA, etc.) can be accommodated in particular embodiments. An auxiliary supply circuit including diode $D_5$ and capacitor $C_1$ can be configured to provide supply voltage $V_{CC}$ for chips or circuitry of, or associated with, the switching power supply. Here, on and off state of main power switch $Q_M$ can be controlled by driving signal $V_{dr}$, which can be generated by any suitable type of control (pulse-width modulation [PWM], etc.).

Particular examples of detection circuit 21 and discharging circuit 22 of the capacitor discharging circuit are disclosed herein. Differential circuit 201 can include differential capacitor $C_d$ and differential resistor $R_d$ to receive voltage $V_x$ of one terminal of the X capacitor, and to generate differential signal $V_d$ (e.g., a spike pulse wave) by a differential operation. Clamping circuit 202 can include zener diode $Z_1$ configured to clamp differential signal $V_d$ within a range of voltages between upper and lower predetermined limits to prevent possible damage to the power switches by a spike voltage of differential signal $V_d$. For example, when differential signal $V_d$ is too high, zener diode $Z_1$ can be broken down to clamp differential signal $V_d$ to the upper limit (e.g., the breakdown voltage). When differential signal $V_d$ is too low, zener diode $Z_1$ can be on, and differential signal $V_d$ can be clamped to the lower limit (e.g., a voltage of about –0.7V).

Voltage converting circuit 203 can include current mirror circuitry. One current mirror circuit can be configured as a cascode current mirror that includes transistors MP1 and MP2 (e.g., with a W/L ratio or a W/W ratio of n:1, where n is an integer greater than 1). The sources of transistors MP1 and MP2 can connect to supply voltage $V_{DD}$, and gates of transistors MP1 and MP2 can connect to driving voltage $V_G$. In one particular example, the W/L or the W/W ratio of transistors MP1 and MP2 can be 2:1. Another current mirror circuit can include transistors MP3 and MP4 with a common gate. For example, the W/L or the W/W ratio of transistors MP3 and MP4 can be 1:1. Also, a voltage at common node D between transistors MP1 and MP3 can be inverted to generate voltage signal $V_1$.

Timing circuit 204 can receive voltage signal $V_1$ and clock signal CLK (e.g., with a fixed frequency), and may output detection signal AC-off. For example, at each rising edge of clock signal CLK, timing circuit 204 can detect the state (e.g., high or low) of voltage signal $V_1$. If voltage signal $V_1$ remains low for at least a duration of a predetermined time interval, detection signal AC-off can transition from low to high after the predetermined interval. Detection signal AC-off going from low to high (being activated) can indicate cut-off of the input terminal of the switching power supply. In some applications, the predetermined time interval can be set by users on demand. In one particular example, the frequency of clock signal CLK can be about 1 kHz, and the predetermined time interval can be about 64 ms.

Discharging circuit 22 can include switch $Q_1$ and resistor $R_1$. For example, switch $Q_1$ can be a transistor, such as an NMOS transistor, and the controlling terminal (e.g., gate) of switch $Q_1$ can receive detection signal AC-off. A first power terminal (e.g., drain) of transistor $Q_1$ can connect to the auxiliary supply circuit (e.g., including tertiary winding T3, diode $D_5$, and capacitor $C_1$), and the second power terminal (e.g., source) of transistor $Q_1$ can connect to resistor $R_1$, which can also connect to ground.

Figure 3B:
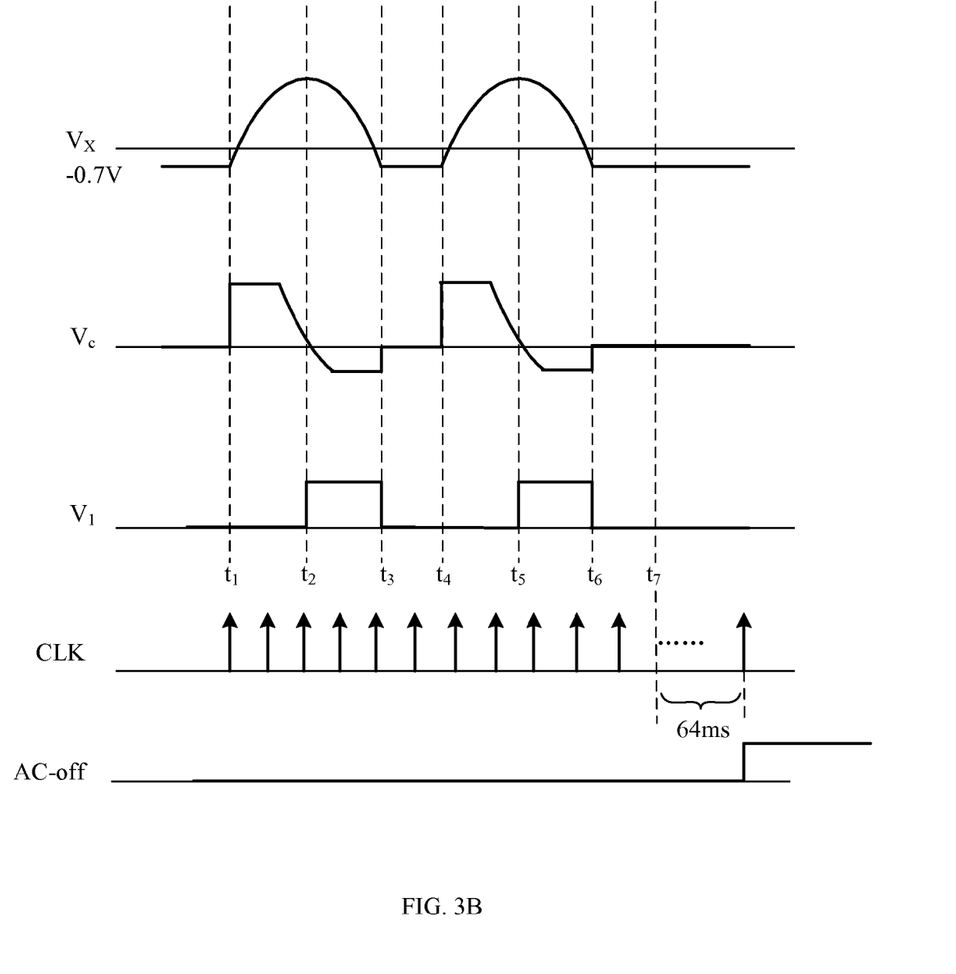
FIG. 3B is a waveform diagram showing example operation of the detection circuit of FIG. 3A.

Referring now to FIG. 3B, shown is a waveform diagram of example operation of the detection circuit of FIG. 3A. At $t_1$, the input terminals of the switching power supply may not be cut-off, voltage $V_x$ at one terminal of the X capacitor can begin to increase, and differential signal $V_d$ from differential circuit 201 can begin to rise correspondingly. When differential signal $V_d$ increases to the upper limit of clamping circuit 202, differential signal $V_d$ can be clamped to the upper predetermined limit as clamped voltage $V_c$. At this time, transistor MP3 can be off, and voltage $V_D$ can be converted to a high level. Thus, voltage signal $V_1$ low at this time.

Until time $t_2$, voltage $V_x$ of one terminal of the X capacitor can reach a peak value, and clamped voltage $V_c$ may cross zero. Therefore, transistor MP3 can be turned on to convert a voltage at node D to be low, and voltage signal $V_1$ can go high as a result. From time $t_2$ to time t3, differential signal $V_d$ can be clamped to be no less than the lower predetermined limit, and transistor MP3 can remain on such that voltage signal $V_1$ remains high. From time $t_3$ to time $t_4$, voltage $V_x$ of one terminal of the X capacitor can be at about –0.7V (the lower predetermined limit), and clamped voltage $V_c$ can remain at zero. Therefore, transistor MP3 can be off, and the voltage at node D can remain high. As a result, voltage signal $V_1$ can remain low.

At time $t_4$, a new cycle can begin, and voltage $V_x$ of one terminal of the X capacitor can begin to rise. Voltage signal $V_1$ can remain low because transistor MP3 remains off. At time $t_5$, transistor MP3 can be turned on, and voltage signal $V_1$ may transition from low to high. Cycle by cycle, if voltage signal $V_1$ can be detected to be high within the predetermined interval (e.g., about 64 ms) this can indicate a cut-in status on the input terminals of the switching power supply.

At time $t_7$, the supply voltage can be cut-off at the input terminals of the switching power supply, and voltage $V_x$ of one terminal of the X capacitor can remain at about −0.7V. Thus, voltage signal $V_1$ can remain low because clamped voltage $V_c$ is zero at this time. If no high level of voltage signal $V_1$ can be detected with the predetermined time interval (e.g., about 64 ms) by timing circuit 204, detection signal AC-off can go high to indicate that the input terminals of the switching power supply have been cut-off. In this case, switch $Q_1$ of discharging circuit 22 can be turned on, and the auxiliary supply circuit can be discharged through resistor $R_1$. Thus in this example, voltage signal $V_e$ (see, e.g., FIG. 2) to be discharged can be supply voltage $V_{CC}$ of the auxiliary supply circuit. In this way, the energy of filtering capacitor $C_B$ can be released, and the energy of the X capacitor can be decreased, in order to at least partially discharge the X capacitor.

Figure 4:
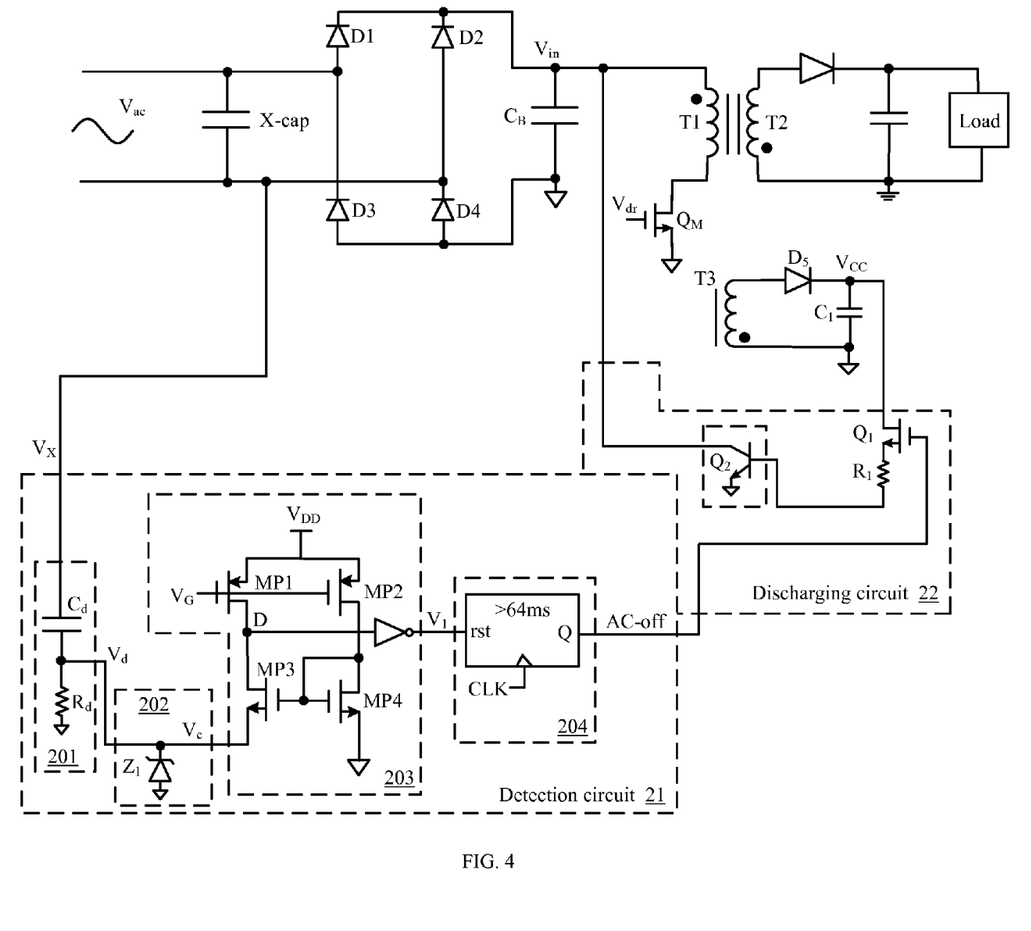
FIG. 4 is a schematic block diagram of a fourth example capacitor discharging circuit, in accordance with embodiments of the present invention.

Referring now to FIG. 4, shown is a schematic block diagram of a fourth example capacitor discharging circuit, in accordance with embodiments of the present invention. In this particular example, discharging circuit 22 can include switches (e.g., transistors) $Q_1$ and $Q_2$, and resistor $R_1$. The controlling terminal (e.g., gate) of switch $Q_1$ can receive detection signal AC-off, the first power terminal (e.g., drain) of switch $Q_1$ can be coupled to the auxiliary supply circuit at supply voltage $V_{CC}$, and the second power terminal (e.g., source) of switch $Q_1$ can connect to resistor $R_1$.

The controlling terminal (e.g., base) of switch $Q_2$ can be coupled to resistor $R_1$ as shown, the first power terminal (e.g., collector) of switch $Q_2$ can connect to filtering capacitor $C_B$, and the second power terminal (e.g., emitter) of switch $Q_2$ can connect to ground. In this particular example, switch $Q_2$ can be a bipolar (NPN) transistor, and the amplifying gain coefficient can be $\beta$. In addition, voltage signal $V_e$ (see, e.g., FIG. 2) to be discharged can be the voltage across filtering capacitor $C_B$ (e.g., $V_{in}$).

When detection circuit 21 detects a cut-off of the input terminals of the switching power supply, detection signal AC-off can go high, and switch $Q_1$ can be turned on to in turn make switch $Q_2$ conduct. In this way, the energy of filtering capacitor $C_B$ can be released through transistor $Q_2$ to decrease the energy stored in the X capacitor, and to at least partially discharge the X capacitor. In the discharging circuitry of this example, the discharging current can be improved $\beta$ times as compared to the above example because a bipolar transistor with gain coefficient $\beta$ can be configured as switch $Q_2$.

Figure 5:
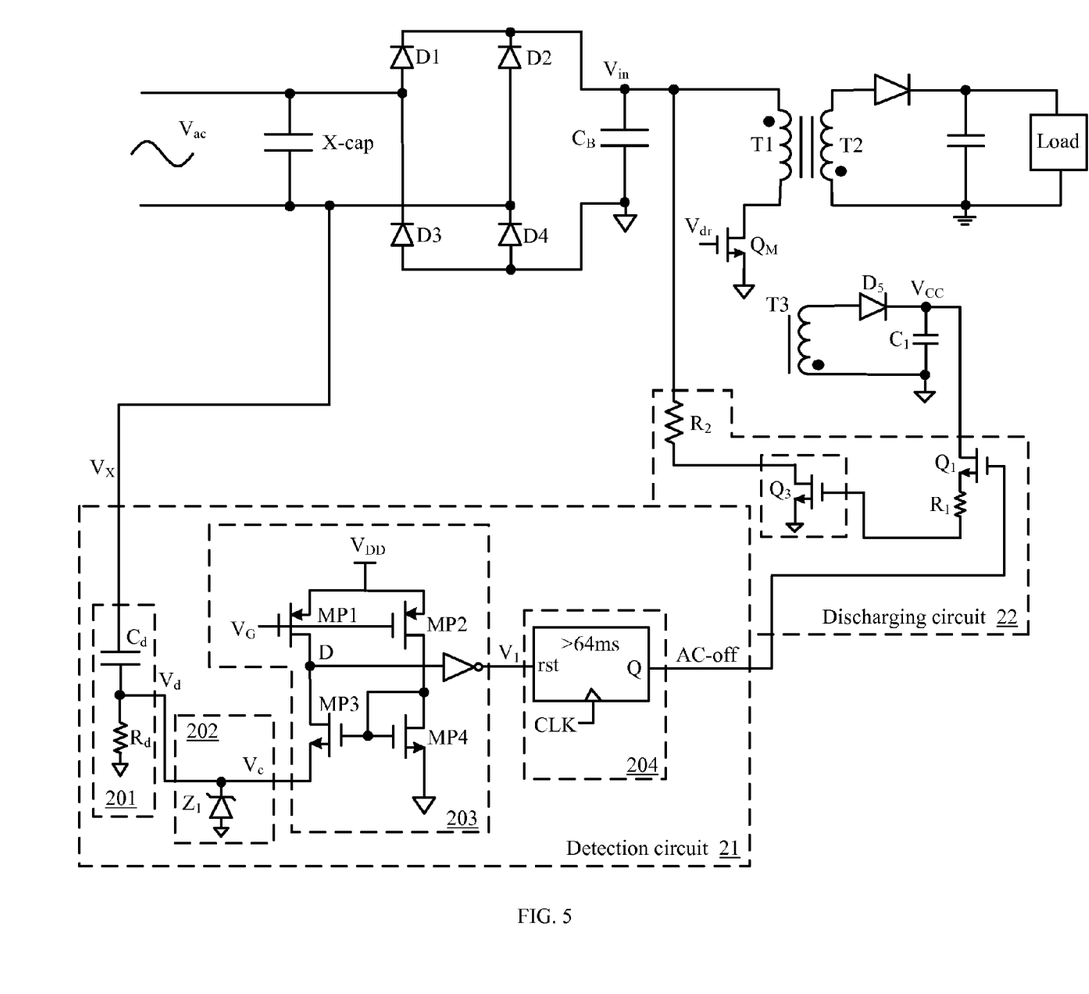
FIG. 5 is a schematic block diagram of a fifth example capacitor discharging circuit, in accordance with embodiments of the present invention.

Referring now to FIG. 5, shown is a schematic block diagram of a fifth example capacitor discharging circuit, in accordance with embodiments of the present invention. The controlling terminal (e.g., gate) of switch $Q_1$ can receive detection signal AC-off, the first power terminal (e.g., drain) of switch $Q_1$ can connect to the auxiliary circuit at supply voltage $V_{CC}$, and the second power terminal (e.g., source) of switch $Q_1$ can be coupled to resistor $R_1$. The controlling terminal (e.g., gate) of switch $Q_3$ can be coupled to resistor $R_1$ as shown, the first power terminal (e.g., drain) of switch $Q_3$ can be coupled to filtering capacitor $C_B$ through resistor $R_2$, and the second power terminal (e.g., source) of switch $Q_3$ can connect to ground. In this example, switches $Q_1$ and $Q_3$ can be any suitable types of transistors (e.g., MOSFET, bipolar, etc.).

In this particular example, voltage signal $V_e$ (see, e.g., FIG. 2) to be discharged can be the voltage (e.g., $V_{in}$) across filtering capacitor $C_B$. When detection circuit 21 detects cut-off of the input terminals of the switching power supply, detection signal AC-off can go high, and switch $Q_1$ can be turned on to in turn make switch $Q_3$ conduct. In this way, the energy of filtering capacitor $C_B$ can be released through resistor $R_2$ and transistor $Q_3$ to decrease the energy stored in the X capacitor and to at least partially discharge of the X capacitor. In this case, the discharging rate can be controlled by regulation of the resistance of resistor $R_2$.

Due to the detection circuits and discharging circuits in particular embodiments, X capacitor discharging can be better applied to switching power supplies, particularly in cases requiring lower power losses, e.g., of no-load and standby operations. In addition, those skilled in the art will recognize that the examples of differential circuits, clamping circuits, voltage converting circuits, timing circuits, and discharging circuits can be replaced by other suitable implementations in particular embodiments.

In one embodiment, a method of controlling a capacitor discharge for a switching power supply, can include: (i) generating a first voltage signal from a voltage at an X capacitor that is coupled between input terminals of the switching power supply; (ii) activating a detection signal in response to the first voltage signal being inactive for a duration of a predetermined time interval, where the detection signal being activated indicates a cut-off of the input terminals; and (iii) at least partially discharging the X capacitor after the cut-off and in response to activation of the detection signal.

Figure 6:
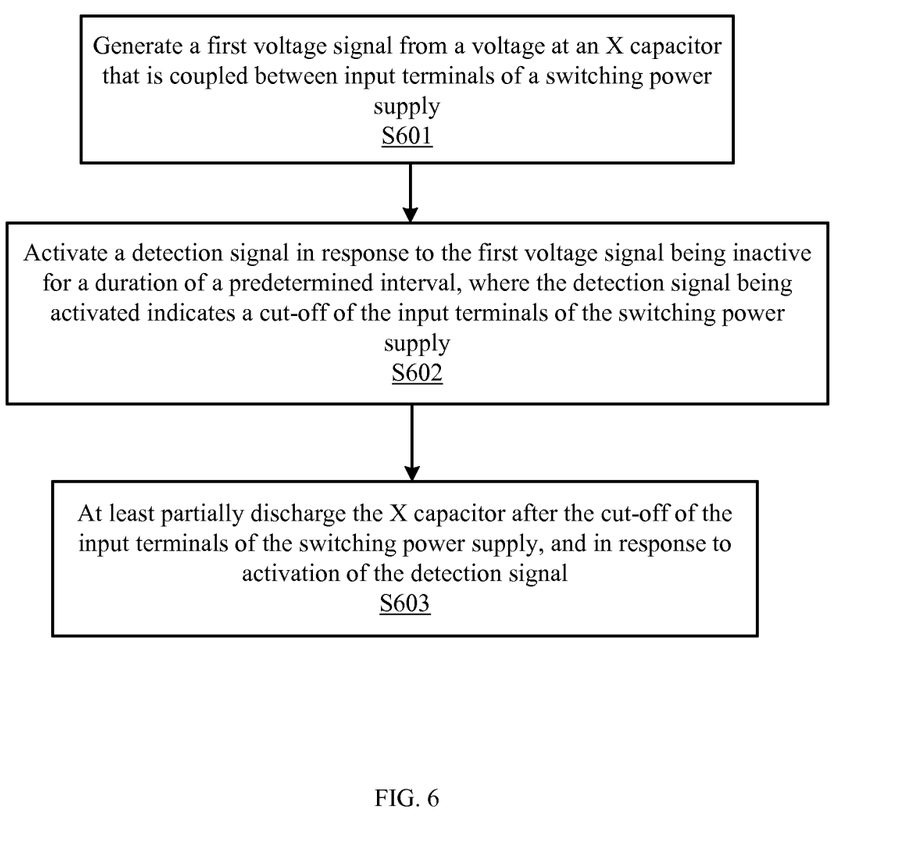
FIG. 6 is a flow diagram of an example method of controlling a discharging of a capacitor, in accordance with embodiments of the present invention.

Referring now to FIG. 6, shown is a flow diagram of an example method of controlling discharging of a capacitor, in accordance with embodiments of the present invention. A switching power supplies can include an X capacitor coupled between the input terminals of the switching power supply. In particular embodiments, a capacitor discharging method can include, at S601, generating a first voltage signal (e.g., $V_1$) from a voltage (e.g., $V_x$) of one terminal of the X capacitor. For example, voltage $V_x$ of the X capacitor can be the voltage on a common node of the X capacitor and a negative input terminal of the switching power supply.

At S602, a detection signal (e.g., AC-off) can be activated (e.g., go high) in response to the first voltage signal being inactive (e.g., low) for a duration of a predetermined time interval (e.g., 64 ms). Activation of the detection signal (e.g., via detection circuit 21) can indicate a cut-off condition of the input terminals of the switching power supply. At S603, the detection signal can be used to at least partially discharge the X capacitor after the cut-off of the input terminals of the switching power supply. As discussed above, the X capacitor can be at least partially discharge via the discharge of filtering capacitor $C_B$ at voltage $V_{in}$ (see, e.g., the discharging circuit arrangement of FIGS. 4 and 5), or via discharge of auxiliary supply circuit supply voltage $V_{CC}$ (see, e.g., the discharging circuit arrangement of FIG. 3A), to name just a couple of examples.

The first voltage signal generation method of a capacitor discharging method of particular embodiments can also include differentiating (e.g., via differential circuit 201) the voltage of one terminal of the X capacitor to generate a differential signal (e.g., $V_d$). The discharging method can also include clamping (e.g., via clamping circuit 202) the differential signal within a voltage range between upper and lower predetermined limits to generate a clamping voltage (e.g., $V_c$). The discharging method can also include converting (e.g., via voltage converting circuit 203) the clamped voltage to generate the first voltage signal ($V_1$). For example, the discharge of the X capacitor can be achieved by discharging the auxiliary circuit (e.g., via supply voltage $V_{CC}$) or the filtering capacitor (e.g., $C_B$) of the switching power supply after the cut-off of the input terminals of the switching power supply.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A method of controlling a capacitor discharge for a switching power supply, the method comprising:
   a) generating a first voltage signal from a voltage at an X capacitor that is coupled between input terminals of said switching power supply, wherein said generating said first voltage signal comprises differentiating said voltage at said X capacitor to generate a differential signal, clamping said differential signal between an upper limit and a lower limit to generate a clamping signal, and converting said clamping signal to generate said first voltage signal;
   b) activating a detection signal in response to said first voltage signal being inactive for a duration of a predetermined time interval, wherein said detection signal being activated indicates a cut-off of said input terminals; and
   c) at least partially discharging the X capacitor after the cut-off and in response to activation of the detection signal.

2. The method of claim 1, further comprising discharging an auxiliary circuit of said switching power supply after said cut-off.

3. The method of claim 1, further comprising discharging a filtering capacitor of said switching power supply after said cut-off.

4. A capacitor discharging circuit for a switching power supply having an X capacitor coupled between input terminals of said switching power supply, the capacitor discharging circuit comprising:
   a) a detection circuit configured to generate a first voltage signal from a voltage at said X capacitor, wherein said detection circuit comprises a differential circuit configured to differentiate said voltage at said X capacitor to generate a differential signal, a clamping circuit configured to clamp said differential signal between an upper limit and a lower limit to generate a clamping signal, and a voltage converting circuit configured to convert said clamping signal to said first voltage signal;
   b) said detection circuit comprising a timing circuit configured to receive a clock signal, and being configured to activate a detection signal in response to said first voltage signal being inactive for a duration of a predetermined time interval, wherein said detection signal being activated indicates a cut-off of said input terminals; and
   c) a discharging circuit configured to at least partially discharge the X capacitor after the cut-off and in response to activation of the detection signal.

5. The capacitor discharging circuit of claim 4, wherein said discharging circuit comprises:
   a) a first switch controllable by said detection signal, wherein said first switch is coupled to an auxiliary circuit of said switching power supply; and
   b) a first resistor coupled to said first switch and ground.

6. The capacitor discharging circuit of claim 4, wherein said discharging circuit comprises:
   a) a first switch controllable by said detection signal, wherein said first switch is coupled to an auxiliary circuit of said switching power supply;
   b) a first resistor coupled to said first switch and to a controlling terminal of a second switch; and
   c) said second switch being coupled to a filtering capacitor of said switching power supply, and to ground.

7. The capacitor discharging circuit of claim 4, wherein said discharging circuit comprises:
   a) a first switch controllable by said detection signal, wherein said first switch is coupled to an auxiliary circuit of said switching power supply;
   b) a first resistor coupled to said first switch, and to a controlling terminal of a second switch, wherein said second switch is coupled to ground; and
   c) a second resistor coupled to said second switch and to a filtering capacitor of said switching power supply.

* * * * *